No. 885,353. PATENTED APR. 21, 1908.
M. LOEB.
APPARATUS FOR SEPARATING FAT FROM WATER.
APPLICATION FILED FEB. 12, 1908.
2 SHEETS—SHEET 1.
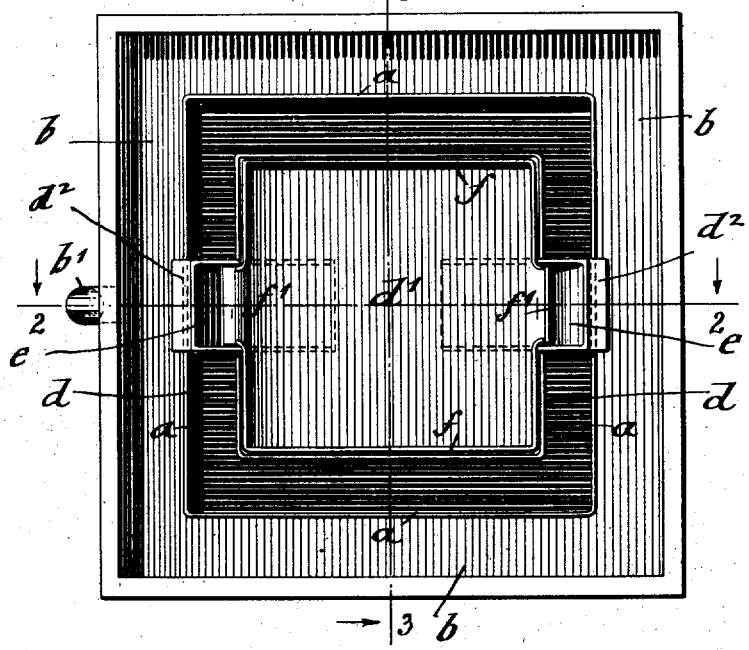
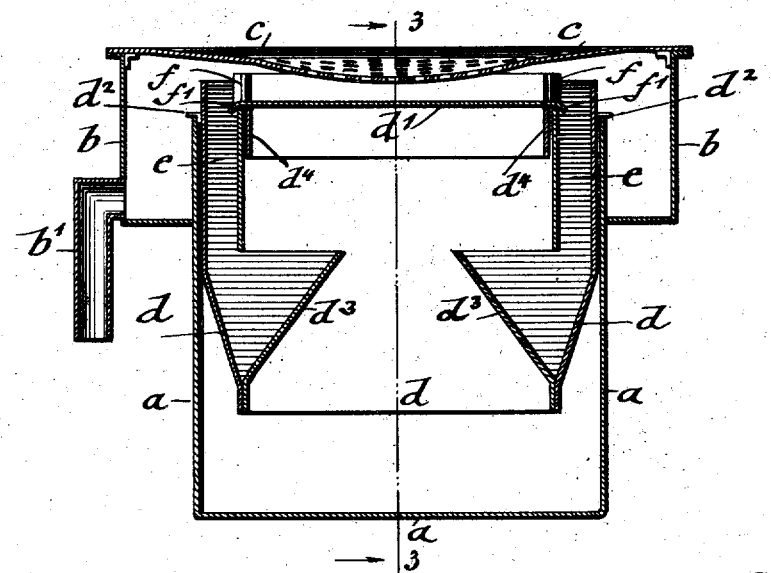

No. 885,353. PATENTED APR. 21, 1908.
M. LOEB.
APPARATUS FOR SEPARATING FAT FROM WATER.
APPLICATION FILED FEB. 12, 1908.
2 SHEETS—SHEET 2.
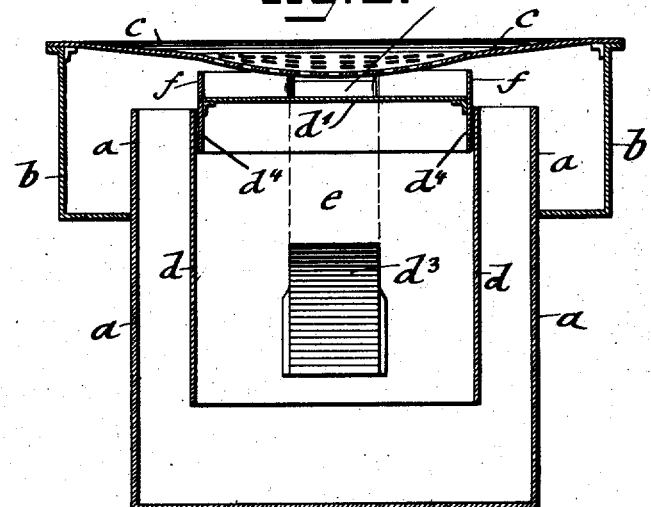
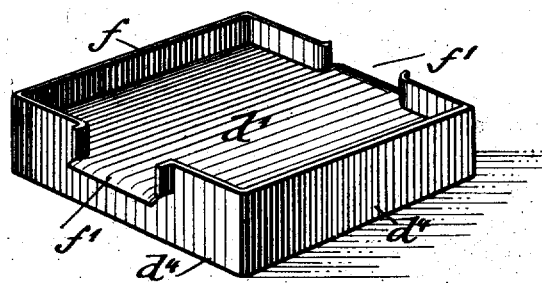
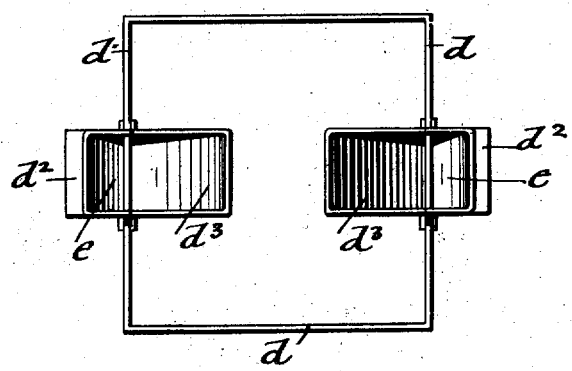
Witnesses:
Inventor
Maurice Loeb
By his Attorneys

UNITED STATES PATENT OFFICE.

MAURICE LOEB, OF NEW YORK, N. Y., ASSIGNOR OF ONE-HALF TO MAURICE MAY, OF NEW YORK, N. Y.

APPARATUS FOR SEPARATING FAT FROM WATER.

No. 885,353.  Specification of Letters Patent.  Patented April 21, 1908.

Application filed February 12, 1908. Serial No. 415,568.

*To all whom it may concern:*

Be it known that I, MAURICE LOEB, a citizen of the Empire of Germany, residing at New York, in the borough of Manhattan, county and State of New York, have invented certain new and useful Improvements in Apparatus for Separating Fat from Water, of which the following is a specification.

This invention relates to certain improvements in apparatus used for separating and collecting fats and solid particles from drain or dish-water and other liquids, which apparatus is specially adapted for the drain-pipes of the kitchen-sinks of hotels, restaurants, meat-markets, private dwellings and the like.

Apparatus for separating fats and other solid particles from water, comprising an exterior vessel provided with an overflow-channel, an interior vessel closed at the top and open at the bottom located within the outer vessel, a chamber within said vessel, a channel for admitting the liquid to the inner vessel, and an upwardly projecting ledge within said inner vessel for directing the liquid toward the chamber in the inner vessel, are well known, but they failed in collecting all the fat and heavy sediments, especially when there was an intermittent and sudden flow of water from the drain-pipe, so that a considerable quantity of the fat and other matters is carried on to the outflow-channel without being separated from the water. Furthermore, the convenient detaching and separation of the interior parts for removing the fat collected in the inner chamber and the sediment collected at the bottom of the outer chamber, and the convenient cleaning of the parts, could not be successfully accomplished.

The object of this invention is to furnish an apparatus for separating fat and other matters from water in which the disadvantages stated may be overcome, the fat and other matters completely separated from the water and then removed by the detachability of the parts from each other; and for this purpose the invention consists of an apparatus for separating fat from water, which comprises an outer vessel having a removable perforated cover and an overflow-trough adjacent to the upper edge of the vessel, an inner vessel open at the lower end and provided with an imperforate detachable cover, said imperforate cover having a flange surrounding the same and outlets at opposite sides thereof, channels communicating with said outlets, and upwardly-inclined ledges at the lower ends of said channels for conducting the drain-water into the interior chamber below the imperforate cover.

The invention consists further of certain details of construction which will be fully described hereinafter and finally defined in the claims.

In the accompanying drawings, Figure 1 represents a plan-view of my improved apparatus for separating fat from water, shown with the cover removed. Figs. 2 and 3 are vertical transverse sections through the apparatus taken respectively at right angles to each other on lines 2, 2, and 3, 3, Fig. 1, Fig. 4 is a perspective view of the detached cover for the interior vessel, shown as detached from the same, and Fig. 5 is a plan-view of the interior vessel with the cover removed from the same.

Similar letters of reference indicate corresponding parts throughout the several figures.

Referring to the drawings, $a$ represents the outer vessel, which is closed at the bottom and open at the top, and which is surrounded by an exterior overflow-trough $b$ the outer wall of which extends above the upper edge of the vessel $a$. A cover $c$ is supported on the outwardly-bent flange of the overflow-trough $b$ by means of angular lugs attached near its outer edge and prevented thereby against lateral displacement. The cover $c$ is provided with a number of perforations in its central depressed or dishing portion. The perforations in the cover serve for distributing the drain or other water to the interior of the outer vessel so as to prevent sudden inflows and rushes of the same. The outer vessel $a$ is preferably made of rectangular shape, but it may be made of round, oblong or other shape. The overflow-channel $b$ receives the water after the fat and sediments have been separated therefrom. From the overflow-trough $b$ leads a suitable drain-pipe $b^1$ to the sewer or any other suitable depository.

In the outer vessel $a$ is supported an interior vessel $d$ whose cross-section corresponds with the cross-section of the outer vessel, but which is somewhat smaller so as to leave a free passageway between the inner and outer vessels. The inner vessel is formed of vertical walls and is open at its lower end, its upper end being closed by a removable cover $d^1$. The inner vessel $d$ is provided upon opposite sides thereof with two substantially vertical conduits or channels $e$, which are rectangular in cross-section and approximately equal in width with the distance between the outer and inner vessels. Each channel is provided, adjacent to its upper end, with outwardly-bent lugs $d^2$ by which the inner vessel $d$ is supported on the upper edge of the outer vessel $a$, both channels communicating at their upper ends with the space above the cover of the inner vessel, and at their lower ends with upwardly-inclined ledges $d^3$ which form pockets with the channels, and which ledges are equal in width with the width of the vertical channels $e$, and connected by side-walls with the side-walls of the channels at the interior of the inner vessel. The ledges $d^3$ serve for conducting the liquid which flows down through the channels $e$ to the interior of the inner vessel in upward direction, so as to deposit the fat carried along with the liquid on the side-walls of the inner vessel and under-surface of the cover $d^1$.

The cover $d^1$ of the inner vessel is formed of a plate which is raised slightly towards the center, and which is provided with vertical walls $d^4$ at the under-side that fit snugly within the walls of the inner vessel at its upper end. Above the top-plate of the cover $d^1$ extend upright flanges $f$, which flanges are cut away at opposite sides in line with the channels $e$ formed between the inner and outer vessels, so as to form outlets communicating with the upper ends of the channels. Between the cut-out portions are located outwardly-curved and downwardly-extending lips $f^1$ which are about equal in width with the width of the channels, and which are adapted to rest on the walls of the inner vessel in such a manner as to be readily removed therefrom or replaced in position therein.

The improved apparatus for separating the fat and other sediments from drain and other water operates as follows: The water passes through the perforated cover of the outer vessel on to the cover of the inner vessel and is distributed uniformly over the same inner vessel and then conducted in opposite directions through the outlets into the downwardly extending delivery-channels and then in upward direction along the inclined ledges into the inner vessel, in which the fat floating on the surface of the drain or dish water is collected at the inner surface of its side-walls and undersurface of its cover after the outer vessel is entirely filled with the liquid. The sediments or heavy matter contained in the drain-water are collected in the bottom of the outer vessel. When the outer vessel is entirely filled with water, the continued supply will cause an overflow at the upper edges into the overflow-channel and from the same by the drain-pipe to the sewer. A perfect separation of the fatty matter and sediments from the water takes place, the fat being congealed on the cool surfaces of the inner chamber and its cover, while the water standing above the same in the outer vessel, after depositing the heavier sediments, will flow off over the edge of the outer vessel in a comparatively clear state. After a certain accumulation of fat has taken place in the inner vessel, the outer cover is removed and the inner vessel bodily removed with its deposit of fat from the outer vessel, after which the cover of the inner vessel is lifted off and the fat removed from the inner surface of the cover and the walls of the inner vessel, while at the same time the inner vessel with its channels and the outer vessel and cover are thoroughly cleansed. The sediments collected at the bottom of the outer vessel are removed and utilized, while the fatty matter regained is purified and used in the arts.

The advantages of my improved fat-separating apparatus are that the same consists of only four parts, viz., the outer vessel and its cover, and the inner vessel and its cover, which are made detachable from each other for the convenient removing of the fat and cleaning of the apparatus, whereby the same is better adapted for the kitchen-sinks of hotels, restaurants, boarding houses and private residences.

Having thus described my invention, I claim as new and desire to secure by Letters Patent:

1. An apparatus for separating fat from water, comprising an outer vessel having a removable perforated cover and an overflow-trough adjacent to the upper edge thereof, an inner vessel open at the lower end and provided with an imperforate cover for closing its upper end, said inner cover having a flange surrounding the same and provided with outlets at opposite sides thereof, and channels communicating with said outlets for conducting the water to the interior of the inner vessel.

2. An apparatus for separating fat from water, comprising an outer vessel having a removable perforated cover and an overflow-trough adjacent to the upper edge thereof, an inner vessel open at the lower end and provided with an imperforate cover for closing the upper end, said inner cover having side-walls fitting into the upper part of the inner vessel and an upwardly-extending flange surrounding the cover and provided with outlets at opposite sides thereof, channels communicating with said outlets and upwardly-inclined ledges at the lower ends of said channels for conducting the water to the interior of the inner vessel.

3. An apparatus for separating fat from water, consisting of an outer vessel provided with an overflow-trough at its upper end, a perforated cover extending over the outer vessel and overflow-trough, an inner vessel open at the lower end, means for supporting said inner vessel on the upper edge of the outer vessel, an imperforate cover for the inner vessel, said inner cover having an upwardly-extending flange surrounding the same and provided with outlets having downwardly-bent lips at opposite sides thereof and channels communicating with said outlets and provided at the lower end with upwardly-inclined ledges for conducting the water to the interior of the inner chamber.

In testimony, that I claim the foregoing as my invention, I have signed my name in presence of two subscribing witnesses.

MAURICE LOEB.

Witnesses:
PAUL GOEPEL,
HENRY J. SUHRBIER.